United States Patent
Colardelle et al.

[11] 3,943,432
[45] Mar. 9, 1976

[54] ELECTRONIC FEEDING BRIDGE

[75] Inventors: Jöel Serge Colardelle, Creteil;
Marie-Helene Comte, Jouy-en-Josas;
Marc Andre Regnier,
Aulnay-sous-Bois, all of France

[73] Assignee: International Standard Electric Corporation, New York, N.Y.

[22] Filed: Sept. 12, 1974

[21] Appl. No.: 505,300

[30] Foreign Application Priority Data
Dec. 10, 1973  France .................... 73.43915

[52] U.S. Cl. .................. 323/7; 323/23; 323/39
[51] Int. Cl.² .................................. H04M 19/00
[58] Field of Search .............. 179/23, 77, 81 R;
307/92–94, 105, 146, 255, 313; 321/10;
323/1, 7, 22 T, 23, 25, 39

[56] References Cited
UNITED STATES PATENTS

| | | | |
|---|---|---|---|
| 3,097,307 | 7/1963 | Bonn | 307/255 X |
| 3,209,205 | 9/1965 | Olson | 323/22 T |
| 3,337,748 | 8/1967 | Rusch et al. | 307/313 X |
| 3,340,404 | 9/1967 | Willems et al. | 307/313 X |
| 3,649,769 | 3/1972 | Pest | 307/255 X |

*Primary Examiner*—A. D. Pellinen
*Attorney, Agent, or Firm*—John T. O'Halloran;
Menotti J. Lombardi, Jr.; R. A. Menelly

[57] ABSTRACT

An electronic feeding bridge for a telephone line uses a two-stage circuit to provide high a.c. impedance between the load and the line and between the line and the load. The first stage includes one NPN type transistor and one PNP type transistor with their bases coupled together by a capacitor. The second stage includes one PNP type transistor and one NPN type transistor with their bases coupled together by a capacitor. The emitters of the transistors of the first stage are connected to the emitters of the transistors of the second through of a pair of resistors. The collectors of the second stage are connected to the load through of a pair of diodes, and the collectors of the transistors of the first stage are connected directly to the line.

2 Claims, 3 Drawing Figures

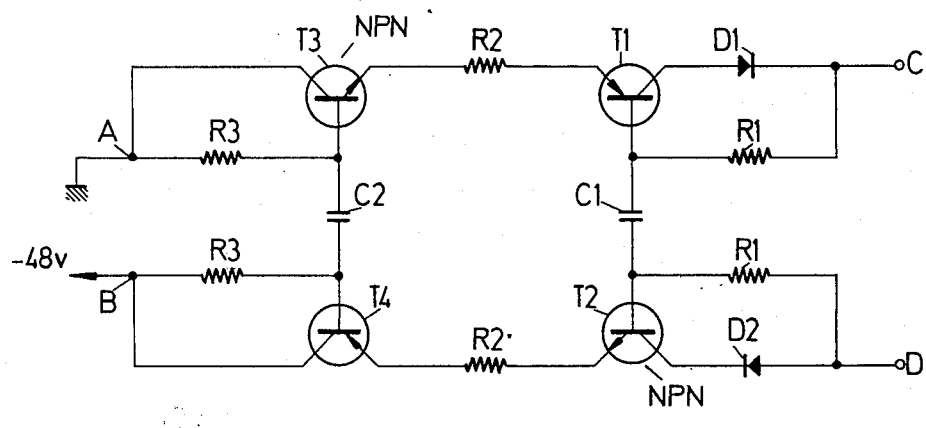
FIG. 1
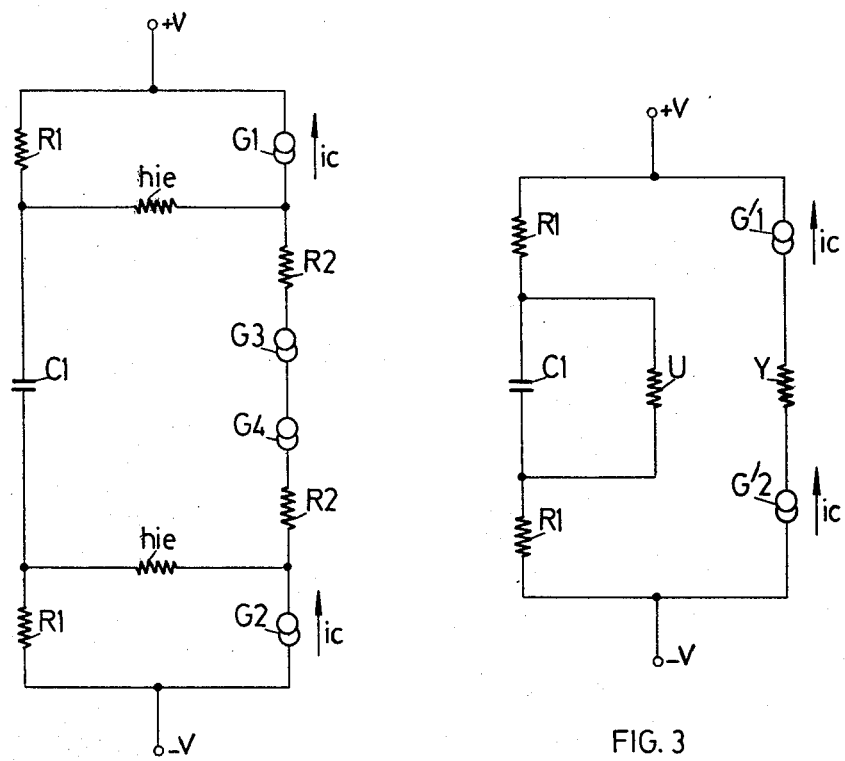
FIG. 2
FIG. 3

ELECTRONIC FEEDING BRIDGE

FIELD OF THE INVENTION

The present invention relates to the modifications of, improvements and additions to "electronic feeding bridge for a telephone line" such as that disclosed in the French Pat. Application No. 73 03357 filed on Jan. 31, 1973 by the applicant.

BACKGROUND OF THE INVENTION

It is of particular interest, especially for reasons of cost and cumbersomeness, to be able to replace large units by a fully electronic circuit of smaller height and volume. A classical solution for supplying direct current to a telephone line consists of using of two symmetrical windings wound on the same magnetic core in opposite winding direction so that, in common mode, only the difference in symmetry of windings causes a differential voltage to appear. The more matched the inductances, the slighter the differential voltage. A symmetrical and fully electronic circuit was described in the above-mentioned parent patent application. Such a circuit, which shall be called "electronic feeding bridge" in the following description, insulates the power source from the point of view of a.c. current from the telephone line, i.e. the feeding bridge presents a high impedance to the telephone line. On the other hand this presents a low impedance to the power source. Thus, if alternating signals exist in the power source, they are transmitted with almost no attenuation to the telephone line through the feeding bridge. Therefore, it is understood how the crosstalk coupling which exists between the various lines of the network by means of the power source is undesirable. It is of particular interest to be able to use a circuit for providing a.c. insulation between the power source and the telephone line to be supplied or in general between a circuit and the source designed to supply the circuit, when both the circuit and the source are the source of alternating signals.

SUMMARY OF THE INVENTION

One object of the present invention is to provide an electronic circuit permitting a load to be supplied with a d.c. current while at the same time providing a.c. insulation of the power source when alternating currents exist in the load and of the load when an undesirable alternating voltage appears in the power source.

According to one feature of the present invention, the circuit includes a first stage having a high input impedance and a low output impedance and a second stage having a low input impedance and a high output impedance.

According to another feature of this invention a virtual inductance appears between the input terminals of the first stage and between the output terminals of the second stage of the circuit. This inductance prevents alternating signals from passing from the input terminals of the first stage to the output terminals of the second stage and vice versa.

BRIEF DESCRIPTION OF THE DRAWINGS

FIG. 1 shows one embodiment of the feeding bridge circuit according to the invention;

FIG. 2 shows an a.c. equivalent circuit of the feeding bridge of FIG. 1; and

FIG. 3 shows another a.c. equivalent circuit of the feeding bridge of FIG. 1.

DESCRIPTION OF THE PREFERRED EMBODIMENT

FIG. 1 shows the electronic feeding bridge of the instant invention, used to supply a d.c. voltage to a subscriber's telephone line. The input terminals A and B of the circuit are connected to terminals of a d.c. power source (−48 volts), while the output terminals C and D of the circuit are connected to the two wires of the subscriber's line to be supplied with a d.c. current. The first stage of the circuit includes transistors T3 of NPN type and T4 of PNP type, their bases being connected to each other through a capacitor C2. For each transistor (T3 and T4), the collector is connected to the base through a resistor R3. The collector of T3 is connected to the ground (positive terminal of the power source) by the terminal A whereas the collector of T4 is connected to the negative terminal (−48 volts) of the power source by the terminal B. The second stage of the circuit is such as the feeding bridge described in the above-mentioned parent patent application. Two diodes D1 and D2 were added to the feeding bridge of the said parent patent application. These diodes, in series with the collector of T1 (diode D1) and the collector of T2 (diode D2), T1 and T2 being the respective PNP and NPN transistors of the said second stage, are designed for protecting transistors T1 and T2 when inopportune surges occur on the line and they do not modify the operating of circuit especially as far as the alternating signals are concerned. Thus, one again finds in second stage two transistors of complementary type T1 and T2. The bases of said transistors are connected to each other through a capacitor C1 and the collectors are connected to the wires of the telephone line through the protective diodes D1 and D2 and the terminals C and D. Resistors R1 are connected one between the base of the transistor T1 and the terminal C and the other between the base of the transistor T2 and the terminal D.

The emitter of T1 of said second stage is connected to the emitter of T3 of said stage through a resistor R2. Likewise the emitter of T2 is connected to the emitter of T4 through another resistor R2. If resistors R2 are considered each being the sum of two serially connected resistors of the same value, the circuit according to the invention and shown in FIG. 1 may be then considered as two feeding bridges placed side by side, such as that described in the above-mentioned parent patent application and symmetrical with respect to the link between stages. Therefore, throughout the following study of the a.c. operating of the circuit according to the invention, it will be referred to the study of the feeding bridge made in the parent patent application and the result of which will be recalled briefly.

FIG. 2 shows an equivalent circuit of the feeding bridge according to the invention when applying an a.c. voltage 2v between terminals C and D. In this equivalent circuit transistors T1 and T2 have been replaced by the current generators G1 and G2 respectively, and their input impedance hie; the reverse voltage amplification factor hre has been considered negligible for each transistor. By taking into account the fact that the power source is equivalent to a short-circuit for alternating signals, the current generators G3 and G4 represent the transistors T3 and T4 respectively.

FIG. 3 shows another equivalent circuit derived from the first one in which the base and collector-emitter circuits have been divided into two branches and U is an impedance whose value is 2 hie + 2 R2 (1 + $\beta$), where $\beta$ is the current gain of transistors, and Y is an impedance whose value depends on the resistance of R2. The current generators G′1 and G′2 represent the current generators G1, G2, G3 and G4 of the equivalent circuit of FIG. 2. It has been found as a result in the parent patent application that the circuit of FIG. 3 is equivalent to an inductance in parallel with a resistor of the value 2 R1. It has been also found as a first approximation that the value of the virtual inductance is a direct function of the sole values of R1, R2 and C1.

Thus, the circuit according to the present invention behaves, in relation to the a.c. signals existing on the line similar to the feeding bridge of the aforementioned French patent application. The said circuit being, as shown earlier, symmetrical with respect to the interstage link, so that it also behaves like an inductance with respect to the a.c. signals existing in the power source. Experiments achieved on this circuit have shown that the a.c. signals coming from either the power source or the load are very much attenuated by the circuit according to the invention, making the circuit suitable for supplying from a d.c. power source a subscriber's telephone line.

Although the present invention has been described in relation with a particular embodiment, it is not limited to this example and is capable of other variations and modifications falling within its scope.

What is claimed is:

1. An electronic circuit for supplying electrical power from a d.c. power source to a subscriber's telephone line comprising:

a first feeding bridge having a high a.c. input impedance and low a.c. output impedance, including a first pair of complimentary transistors having their bases connected by a first capacitor, the input terminals of said bridge connected each to a terminal of said d.c. power source, and said terminals being common to the collector and to the resistor between base and collector of each transistor of said complimentary pair of transistors;

a second feeding bridge having a low a.c. input impedance and a high a.c. output impedance including a second pair of complimentary transistors having their bases connected by second capacitor, the output terminals of said bridge connected each to a wire of said subscriber's line, are common to the collector and to the resistor between base and collector of each transistor of said second complimentary pair of transistors, and the output of said first pair of complimentary transistors being connected to the input of said second pair of complimentary transistors by resistive coupling between the corresponding emitters, whereby the combination of said first and second feeding bridge provides high impedance to a.c. signals originating in said d.c. power source and on said subscriber line, to isolate the flow of a.c. signals between said d.c. power source and said subscriber's line and between said subscriber's line and said d.c. power source.

2. The circuit of claim 1 wherein said second pair of complimentary transistors each include a diode connected between the collector and its associated output terminal.

* * * * *